US006431328B1

(12) United States Patent
Tagami et al.

(10) Patent No.: US 6,431,328 B1
(45) Date of Patent: Aug. 13, 2002

(54) PARKING LOCK DEVICE FOR THREE-WHEELED VEHICLE

(75) Inventors: Takuya Tagami; Takashi Ozeki, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/925,371

(22) Filed: Aug. 10, 2001

(30) Foreign Application Priority Data

Aug. 10, 2000 (JP) .......................................... 2000-243093

(51) Int. Cl.[7] ................................................ B60T 1/00
(52) U.S. Cl. ...................... 188/31; 188/24.18; 188/69; 180/210; 280/282; 70/228
(58) Field of Search .............................. 188/31, 60, 69, 188/24.18, 24.22, 265; 180/210, 215; 280/282; 70/192, 207, 210, 211, 224, 228, 233, 236

(56) References Cited

U.S. PATENT DOCUMENTS

| 4,356,876 A | * | 11/1982 | Watanabe et al. ........... 180/210 |
| 4,487,282 A | * | 12/1984 | Wakatsuki et al. .......... 180/210 |
| 4,534,439 A | * | 8/1985 | Shimazaki et al. ......... 180/215 |
| 5,269,195 A | * | 12/1993 | Kitagawara ................... 188/69 |
| 5,386,742 A | * | 2/1995 | Irikura et al. ................. 188/31 |

FOREIGN PATENT DOCUMENTS

JP          B1123356          5/1989

* cited by examiner

*Primary Examiner*—Pam Rodriguez
(74) *Attorney, Agent, or Firm*—Birch, Stewart, Kolasch & Birch, LLP

(57) ABSTRACT

A parking lever for drawing a cable for locking rear wheels of a three-wheeled vehicle is provided on the front body. A rear wheel lock mechanism for locking the rear wheels is provided on the rear body. A roll lock mechanism for locking the relative rotation between a joint shaft and a case body is provided on the joint case provided with the joint shaft and the case body. The cable for locking the rear wheels is extended over between the parking lever and the rear wheel lock mechanism. The cable for roll lock is extended over between the rear wheel lock mechanism and the roll lock mechanism. The torsion of the cable for locking rear wheels caused by relative roll between the front body and the rear body can be absorbed at a long distance as compared with the prior art. Excessive load is not applied to the cable for locking the rear wheels, and even if the joint case is miniaturized, there is less restriction to easily realize miniaturization of the body.

11 Claims, 12 Drawing Sheets

PARKING LOCK DEVICE FOR THREE-WHEELED VEHICLE

This application claims priority under 35 U.S.C. § 119(a) on Patent Application No. 2000-243093 filed in Japan on Aug. 10, 2000, which is herein incorporated by reference.

BACKGROUND OF THE INVENTION

1. Field of the Invention

The present invention relates to a parking lock device for a three-wheeled vehicle suitable for lowering manufacturing costs and maintenance costs.

2. Description of the Background Art

A parking lock device for an oscillating type three-wheeled vehicle is disclosed in Japanese Patent Publication No. 1989-23356. The three-wheeled vehicle includes one front wheel mounted on the front body, and two wheels mounted on the rear body. The front body and the rear body are joined to be rolled freely by a joint part. The rear body is provided with a rear-wheel lock mechanism for locking the rear wheel by a brake or the like, whereby at the time of parking, rolling movement of the front body and the rear body is locked to lock (brake) the rear wheels.

A description will be made with reference to FIGS. 15 and 16 which correspond to FIGS. 1 and 2 of the aforementioned Patent Publication. FIG. 15 shows the main parts in the original FIG. 1. Reference numerals used indicate those used in the aforementioned Patent Publication.

FIG. 15 is a side view of main parts of a conventional three-wheeled vehicle. An oscillating type three-wheeled vehicle 200 is a vehicle in which a front body 201 on the front wheel side and a rear body 202 on the rear wheel side constitute a vehicle body. An oscillating joint 203 is mounted vertically movably by means of a pin 201a at the rear of the front body 201. A rear frame 204 is mounted at the rear of the oscillating joint 203. A rear wheel 205 and a brake arm 206 of a brake for braking the rear wheel 205 are arranged on the rear frame 204 side. A lock operating lever (not shown) for carrying out the parking lock is provided in the vicinity of a handle of the front body 201. A single operating cable 207 is connected to the oscillating joint 203 and the brake arm 206 from the lock operating lever.

FIG. 16 is a sectional view of a conventional oscillating joint, in which a support shaft 211 is rotatably mounted on a lower case 208 and an upper case (not shown) of the oscillating joint 203. A stopper plate 212 is mounted on the front end of the support shaft 211. A stopper pole 213 and a swing arm 214 are mounted in a manner free to swing on a lower case 208 for locking the rotation of the stopper plate 212. An inner (wire) 215 of the operating cable 207 is connected to the end of the swing arm 214, and the outer tube side of the operating cable 207 is divided into an outer 216 and an outer 217 with respect to the single inner (wire) 215.

7In the art of the aforementioned Patent Publication, mounting locations of the operating cable 207 on the body are a point 218 on the oscillating joint 203 and a point 219 in the vicinity of the brake arm 206. Since the points 218 and 219 are subjected to relative rolling movement by the oscillating joint 203, the operating cable 207 is twisted in a short distance (distance DA) between the points 218 and 219 to impose a burden to the operating cable 207. Accordingly, it is contemplated that in a case where miniaturization of the body is studied, if the dimension of the oscillating joint 203 is simply reduced, the twisting of the operating cable 207 becomes further increased, resulting in a shorter life of the operating cable 207, which poses restriction when miniaturization is taken into consideration.

Further, in FIG. 16, since the operating joint 207 has its midpoint connected to the oscillating joint 203, a plurality of parts are mounted in order that the outer tube side is divided (into the outer 216 and the outer 217), and the swing arm 214 is connected to the inner wire 215, which makes the construction of the operating cable 207 complicated, bringing forth an increase in manufacturing costs, and requiring many steps for the maintenance for mounting and dismounting or replacement of the operating cable 207.

SUMMARY OF THE INVENTION

It is therefore an object of the present invention, in a parking lock device for a three-wheeled vehicle, to miniaturize the body without receiving great restriction to reduce the weight, and to simplify the construction to lower part costs and maintenance costs.

For achieving the aforesaid object, the present invention provides a parking lock device for a three-wheeled vehicle in which a front body having a front wheel mounted thereon and a rear body having rear wheels mounted thereon are joined by a substantially laterally extending shaft and a bearing to thereby connect the front body and the rear body to be relatively rollable. By drawing a cable at the time of parking, the relative rolling between the front body and the rear body can be locked, and the rotation of the rear wheels can be locked. The front body is provided with a parking lever for drawing said cable. The rear body is provided with a rear-wheel lock mechanism for locking the rear wheels. A joint part between said shaft and said bearing is provided with a roll lock mechanism for locking the relative rotation between said shaft and said bearing. A front half part of the cable is extended over between said parking lever and said rear-wheel lock mechanism, and a rear half part of the cable is extended over between said rear-wheel lock mechanism and said roll lock mechanism.

Since the front half part of the cable is extended over between the front body and the rear body, the twisting of the cable caused by the relative rolling between the front body and the rear body is absorbed in a long distance as compared with the prior art. Thereby, even if the joint part is miniaturized, the excessive load is not applied to the cable to enable extension of the service life of the cable.

According to the present invention, the front half part of said cable is constituted by a first cable, and the rear half part of said cable is constituted by a second cable separate from the first cable. The first cable and the second cable can be made simple in construction. For example, if general cables are used, parts costs can be reduced considerably. Further, maintenance costs of cables can be lowered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
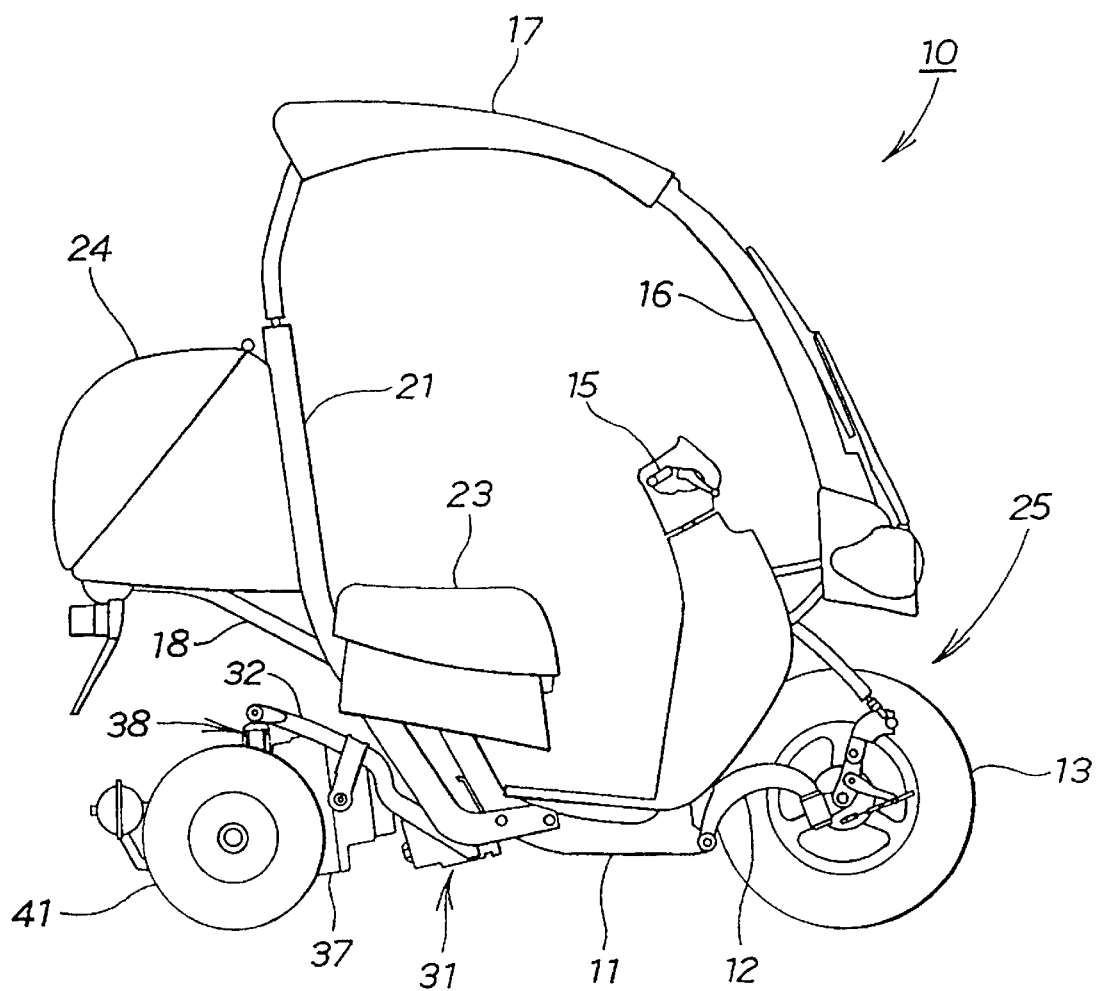
FIG. 1 is a side view of a three-wheeled vehicle provided with a parking lock device according to the present invention.

The present invention will now be described with reference to the accompanying drawings. As shown in FIG. 1, a three-wheeled vehicle 10 includes a front swing arm 12 mounted vertically movably at a front lower part of a body frame 11. A front wheel 13 is mounted laterally movably on the front end of the front swing arm 12. A handle 15 is mounted rotatably on the upper part of the body frame 11. A wind screen 16 is mounted on the upper part of the body frame 11, and part of a roof 17 is mounted on the upper end of the wind screen 16. Poles 21 extend upwardly from rear frames 18 which extend rearward and obliquely upwardly from the back of the body frame 11 for mounting the rear part of the roof 17. A seat 23 and a luggage box 24 are mounted on the rear frames 18 and the poles 21. The above constitution is a front body 25 of the three-wheeled vehicle 10.

Figure 2:
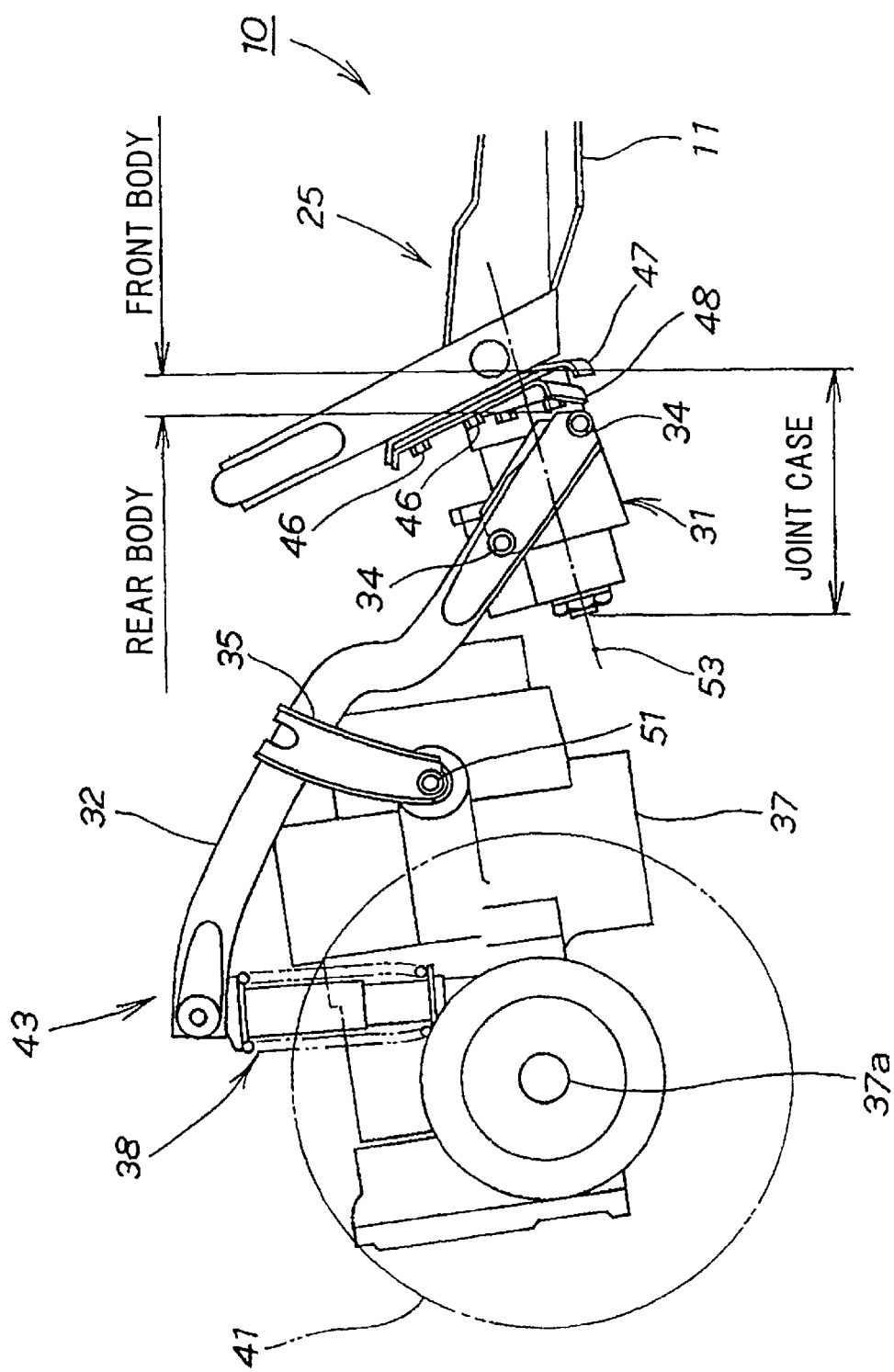
FIG. 2 is a side view of a rear part of the three-wheeled vehicle according to the present invention.

As shown in FIG. 2, a joint case 31 is mounted on the lower rear end of the body frame 11 for joining the front body 25 and a rear body. A pair of left and right rear arms 32 are mounted by bolts 34 on the side of the joint case 31. The side of a power unit 37 is mounted in a freely swingable manner through a pair of brackets 35 located midway along the rear arms 32. The power unit 37 is mounted through a rear cushion unit 38 on the rear end part of the rear arms 32. A pair of rear wheels are mounted on an output shaft 37a of the power unit 37. The constitution at the rear of the joint case 31 described above is a rear body 43 of the three-wheeled vehicle.

In the joint case 31, the front body 25 and the rear body 43 are joined by a shaft extending in a substantially longitudinal direction of the body and a bearing (or on the side of a bearing) to thereby connect the front body 25 and the rear body 43 in a manner free to roll relatively, and at the time of parking, the relative rolling between the front body 25 and the rear body 43 can be locked. Flanges 47, 48 for mounting by bolts 46 on the lower end part of the body frame 11 are provided at the front part.

The power unit 37 swings about support shafts 51, and the rear cushion unit 38 is provided to relieve the shock received by the power unit 37, the front body 25 and the rear body 43 when the power unit 37 swings. Numeral 53 designates a shaft center of a joint shaft (described later) housed in the joint case 31.

Figure 3:
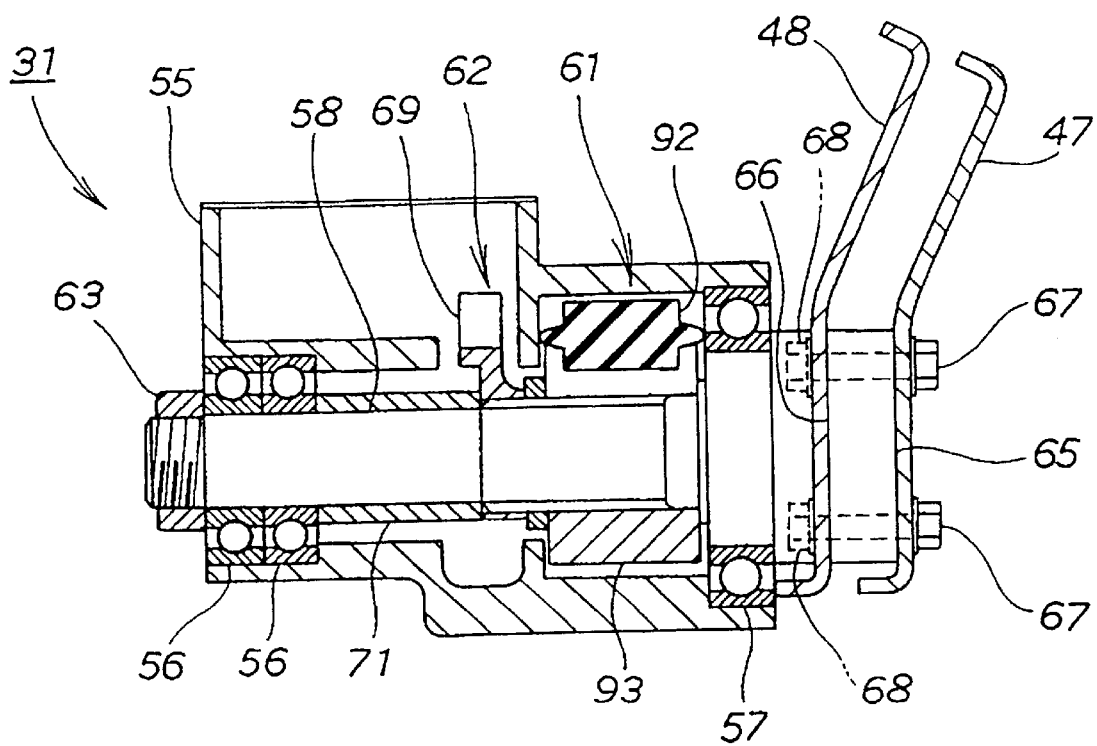
FIG. 3 is a sectional view of a joint case of the three-wheeled vehicle according to the present invention.

As shown in FIG. 3, a joint case 31 comprises a case body 55, a joint shaft 58 supported on the case body 55 through bearings 56, 56, 57, the flanges 47, 48 mounted on the front part of the joint shaft 58, a damper 61 interposed between the case body 55 and the joint shaft 58, and a roll lock mechanism 62 described in detail later. Numeral 63 designates a nut for preventing the joint shaft 58 from slipping out.

Hereupon, the body 55 is provided to support the joint shaft 58 through the bearings 56, 56, 57, and is a bearing in a broad sense. (In a case where the joint shaft 58 is received directly by the case body 55 without using the bearings 56, 56, 57, the case body 55 serves as a sliding bearing).

The joint shaft 58 forms flange mounting surfaces 65, 66 on the front part, a flange 47 and a flange 48 are tightened to the flange mounting surface 65 and the flange mounting surface 66, respectively, by means of bolts 67 and nuts 68.

In the roll lock mechanism 62, a sideways projecting member 69 having a fan-like portion projected sideways of the joint shaft 58 is subjected to serration coupling (spline coupling) to the joint shaft 58. Numeral 71 designates a collar interposed between the bearing 56 and the sideways projecting member 69.

Figure 4:
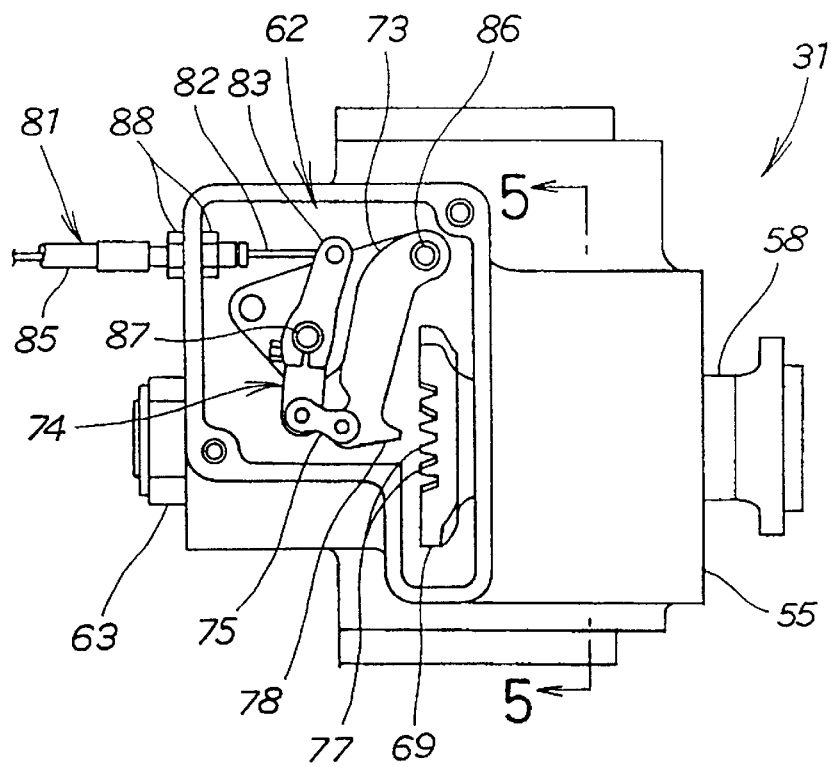
FIG. 4 is a plan view of a joint case of the three-wheeled vehicle according to the present invention.

FIG. 4 shows the state that a lid provided at the upper part of the joint case 31 is removed. A roll lock mechanism 62 of the joint case 31 is a mechanism for locking the relative rotation between the joint shaft 58 and the case body 55, and comprises a sideways projecting member 69 mounted on the joint shaft 58, a first arm-like member 73 mounted in a manner free to swing on the case body 55 for locking the rotation of the sideways projecting member 69, a second arm-like member 74 mounted in a manner free to swing on the case body 55 for pressing the first arm-like member 73 against the sideways projecting member 69, and a link member 75 interposed between the first and second arm-like members 73 and 74.

The sideways projecting member 69 is provided with teeth 77, and the first arm-like member 73 is provided at the extreme end with a pawl 78 meshed with the teeth 77 of the sideways projecting member 69. The second arm-like member 74 is provided at the end with a cable mounting part 83 for mounting an inner cable 82 constituting a cable 81 for roll lock.

Reference numeral 85 designates an outer tube constituting the cable for roll lock 81, numeral 86 is a swing shaft of the first arm-like member 73, numeral 87 is a swing shaft of the second arm-like member 74, and numeral 88 designated nuts for mounting the cable for roll lock 81 on the cable body 55.

Figure 5:
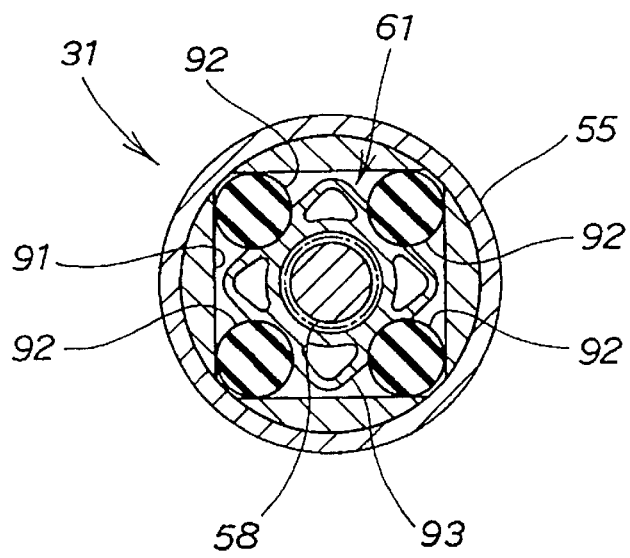
FIG. 5 is a sectional view taken on line 5—5 of FIG. 4.

As shown in FIG. 5, a damper part 61 of the joint case 31 comprises a damper receiving chamber 91 provided internally of the case body 55, damper rubbers 92 arranged at four corners of the damper receiving chamber 91, and a pressing member 93 arranged internally of the damper rubbers 92 and spline-coupled to the joint shaft 58, which is a so-called "Neidhart damper" in which the pressing member 93 presses and contract the damper rubbers 92 to exhibit the damping action.

Figure 6:
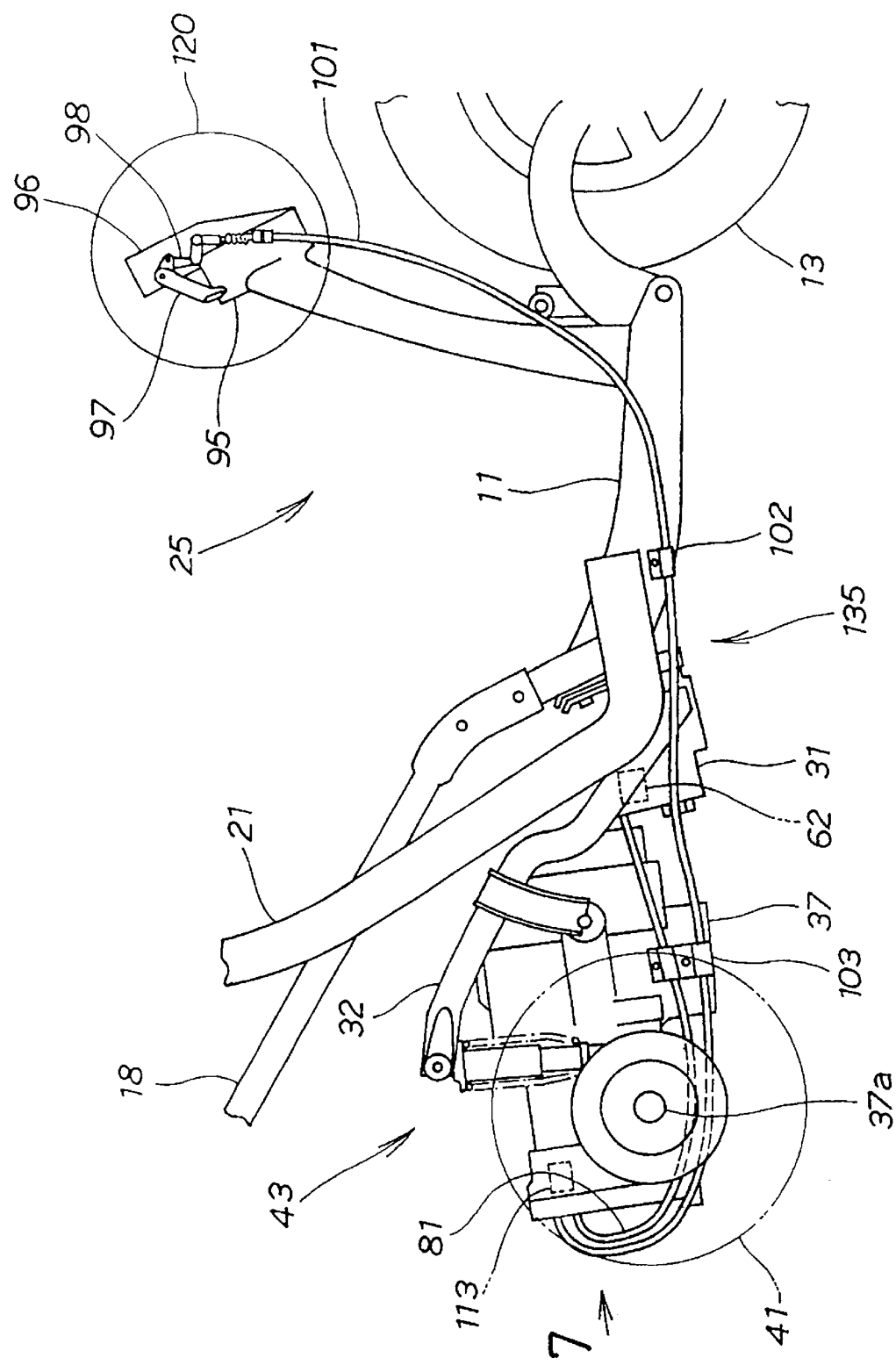
FIG. 6 is a side view showing main parts of a front body and a rear body of the three-wheeled vehicle according to the present invention.

As shown in FIG. 6, a head pipe 95 for mounting a handle rotatably is provided at the upper part of the body frame 11. A bracket 96 is mounted at the front part of the head pipe 95. A parking lever 97 for locking the rear wheels 41 at the time of parking is mounted on the bracket 96. A cable 101 for locking rear wheels as a first cable through a link member 98 is mounted on the parking lever 97. The cable 101 for locking the rear wheels 41 is extended to the rear part of the power unit 37. The cable 101 for locking the rear wheels 41 is secured by cable mounting brackets 102, 103 to the side of the body frame 11 and the lower part of the side of the power unit 37. The cable for roll lock 81 as a second cable is extended to the rear part of the joint case 31 from the rear part of the power unit 37. The cable for roll lock 81 is secured to the power unit 37 along with the cable 101 for locking the rear wheels 41 by the cable mounting bracket 103. The cable 101 for locking the rear wheels 41 and the cable for roll lock 81 are not shown in FIGS. 1 and 2 for clarity.

Figure 7:
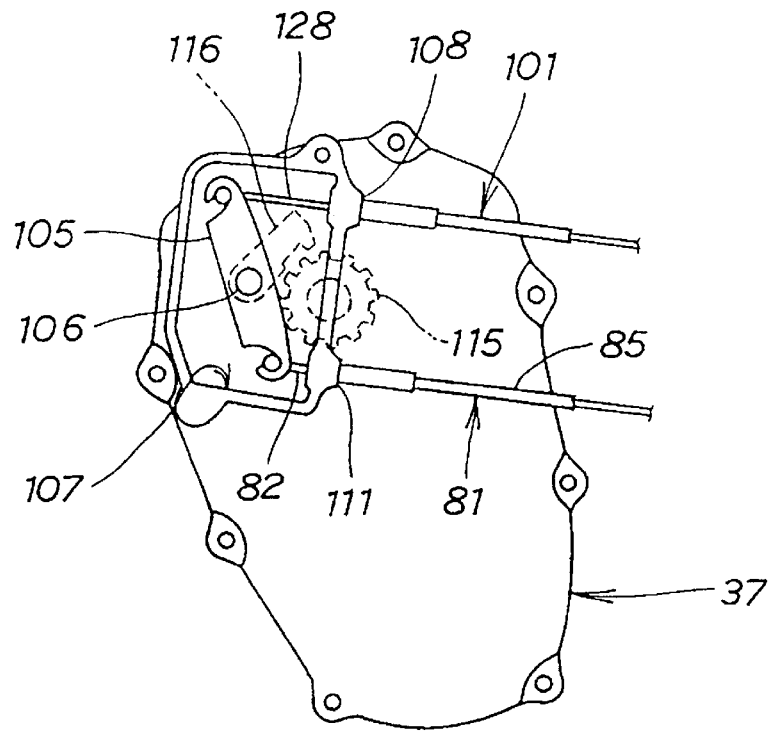
FIG. 7 is a view as viewed from arrow 7 of FIG. 6.

As shown in FIG. 7, the power unit 37 has an operating lever 105 for locking the rear wheels 41 mounted at the rear part thereof. The operating lever 105 has a cable 101 for locking the rear wheels 41 and a cable 81 for roll lock mounted on one and the other end, respectively. Reference numeral 106 designates a swing shaft mounted integrally with the operating lever 105, numeral 107 is an operating lever receiving part, numeral 108 is a first cable mounting part for mounting the cable 101 for locking the rear wheels 41, and numeral 111 is a second cable mounting part for mounting the cable 81 for roll lock.

Figure 8:
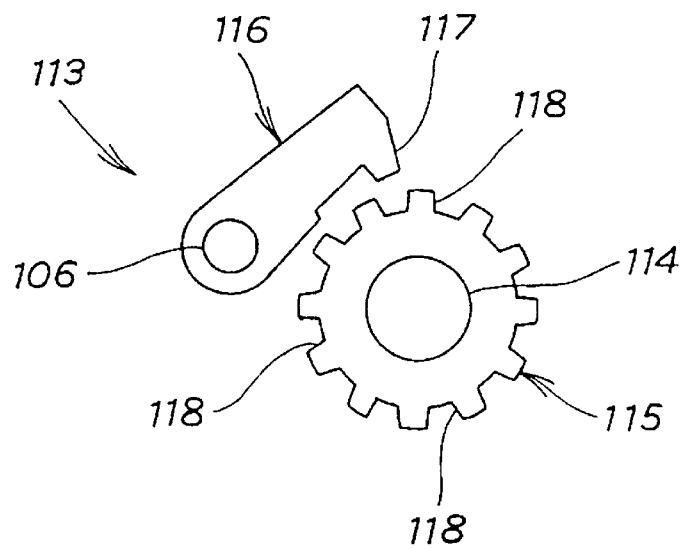
FIG. 8 is an explanatory view of a rear wheel lock mechanism received in a power unit of the three-wheeled vehicle according to the present invention.

As shown in FIG. 8, a rear wheel lock mechanism 113 comprises a parking shaft 114 connected to an output shaft 37a (see FIG. 6) of the power unit 37 (see FIG. 6), a parking gear 115 mounted on the parking shaft 114, and an arm-like member 116 mounted on the swing shaft 106 of the operating lever 105 for locking rotation of the parking gear 115. The swing shaft 106 is pivoted to thereby mesh a pawl 117 provided on the arm-like member 116 with a tooth 118 of the parking gear 115, thus stopping rotation of the parking shaft 114 so that the rear wheels 41 (see FIG. 6) are locked through the output shaft 37a of the power unit 37.

Figure 9:
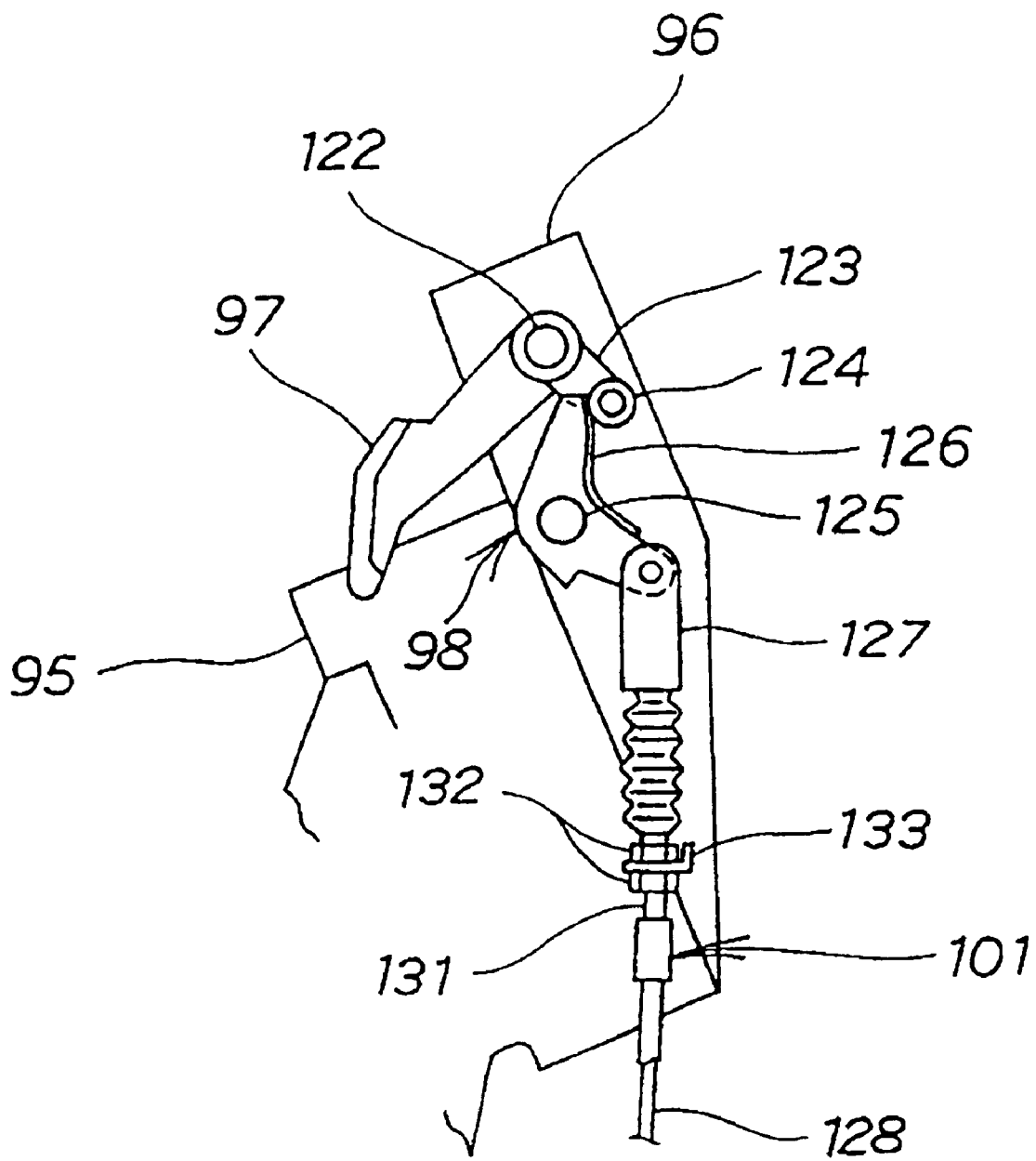
FIG. 9 is an enlarged view of a part 120 in FIG. 6.

FIG. 9 shows that the parking lever 97 is mounted on the bracket 96 in a manner free to swing by a swing shaft 122. An arm part 123 is mounted integrally with the parking lever 97. A rotatable roller 124 is mounted in a manner free to rotate on the extreme end of the arm part 123. A link member 98 is mounted on the bracket 96 in a manner free to swing by a swing shaft 125. The link 98 is formed with a curved edge 126 with which the roller 124 comes in contact. An end hardware 127 of the cable 101 for locking the rear wheels 41 is mounted on the link member 98. An inner cable 128 of the cable 101 for locking the rear wheels 41 is connected to the end hardware 127. A cable mounting bracket 133 for securing an outer tube 131 of the cable 101 for locking the rear wheels 41 is mounted on the bracket 96.

In FIG. 6, the parking lock device 135 according to the present invention comprises a constitution from the parking lever 97 to the operating lever 105 (see FIG. 7) of the power unit 37 through the cable 101 for locking the rear wheels 41, and a constitution from the rear wheel lock mechanism 113 (see FIG. 8), the operating lever 105 to the roll lock mechanism 62 (see FIG. 4) through the cable 81 for roll lock. The operation of the parking lock device 135 described above will be described hereinafter.

Figure 10:
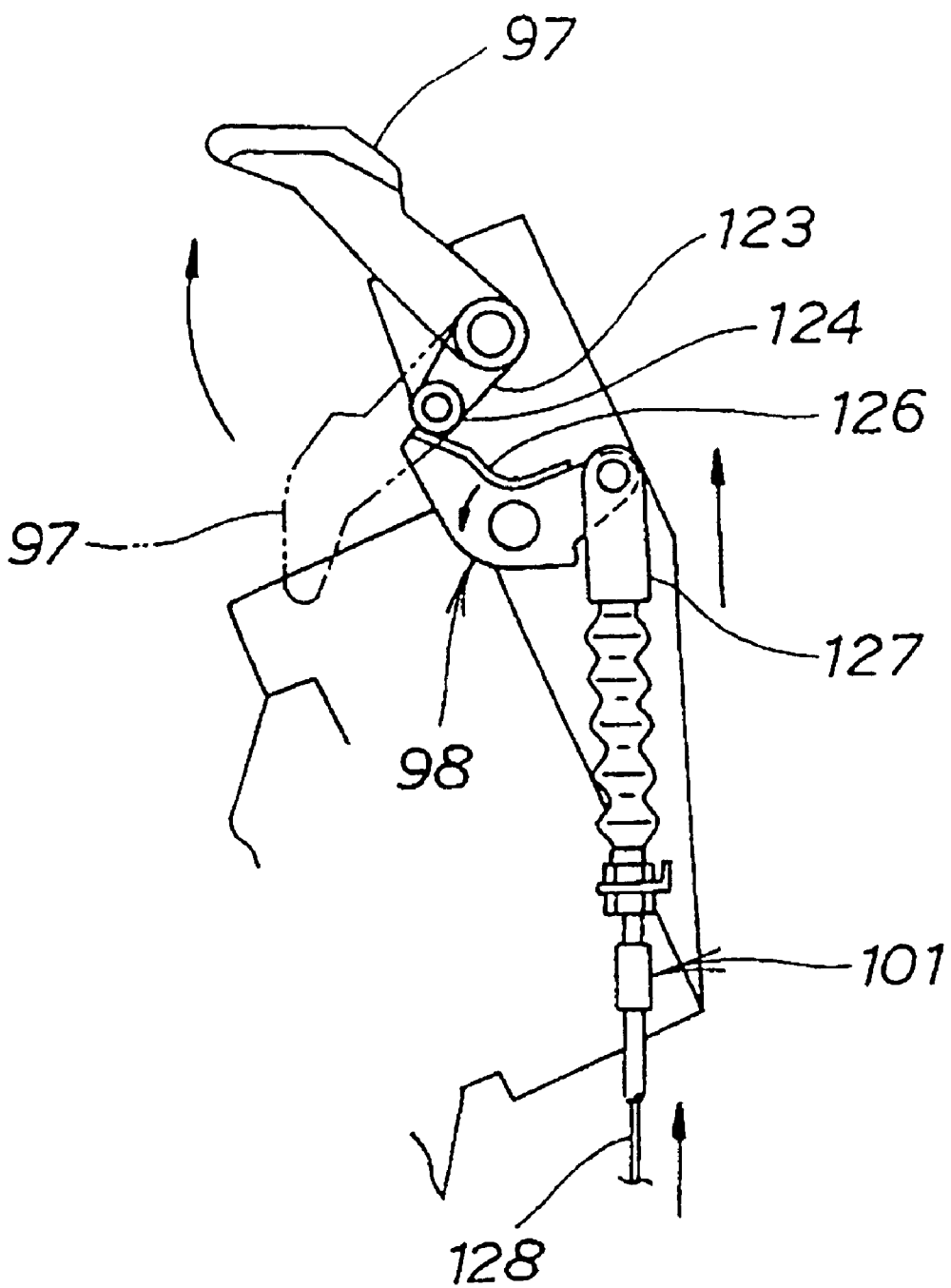
FIG. 10 is a first operation view for explaining operation of the parking lock device according to the present invention.

Referring now to FIG. 10, for parking the three-wheeled vehicle, first, when the parking lever 97 is pulled up as shown by the arrow from a position indicated by the imaginary line, the arm part 123 swings clockwise as the parking lever 97 swings so that the roller 124 pushes down one end of the link member 98 while coming into contact with the curved edge 126 of the link member 98, and therefore the link member 98 swings counterclockwise as indicated by the arrow, and the other end of the link member 98 moves up to pull the inner cable 128 of the cable 101 for locking the rear wheels 41 through the end hardware 127.

Figure 11:
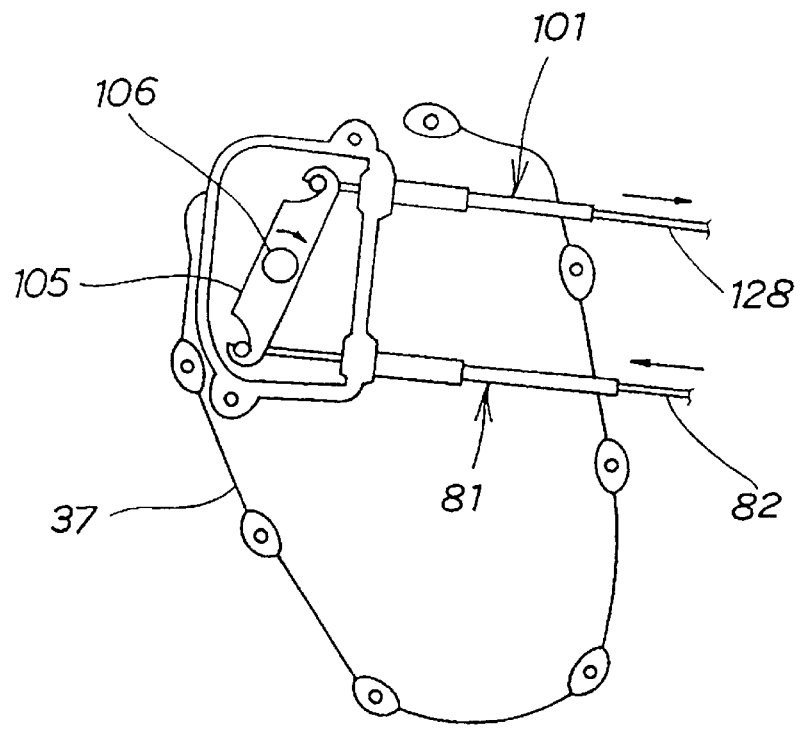
FIG. 11 is a second operation view for explaining operation of the parking lock device according to the present invention.

Referring now to FIG. 11, when the inner cable 128 of the cable 101 for locking the rear wheels 41 is pulled, the operating lever 105 mounted at the rear of the power unit 37 swings clockwise to pull the inner cable 82 of the cable 81 for roll lock.

Figure 12:
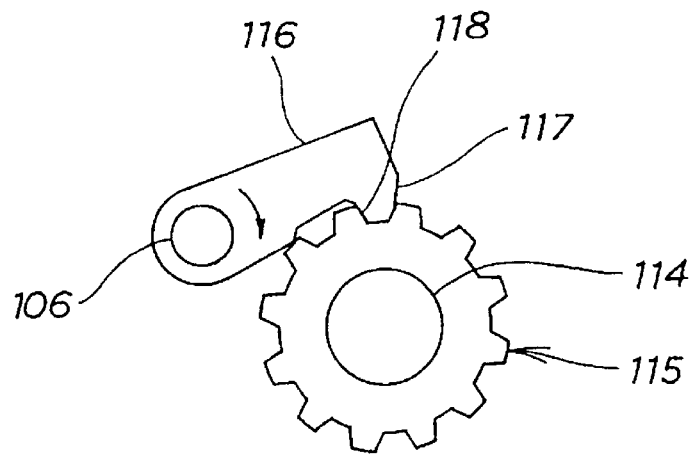
FIG. 12 is a third operation view for explaining operation of the parking lock device according to the present invention.

Referring now to FIG. 12, when the operating lever 105 (see FIG. 11) swings clockwise, the swing shaft 106 rotates to swing the arm-like member 116 clockwise, and the pawl 117 of the arm-like member 116 meshes with the tooth 118 of the parking gear 115, because of which the parking gear 115 and the parking shaft 114 become disabled to rotate so that the output shaft 37a of the power unit 37 shown in FIG. 6 connected to the parking shaft 114 becomes locked and the rear wheels 41 are locked.

Figure 13:
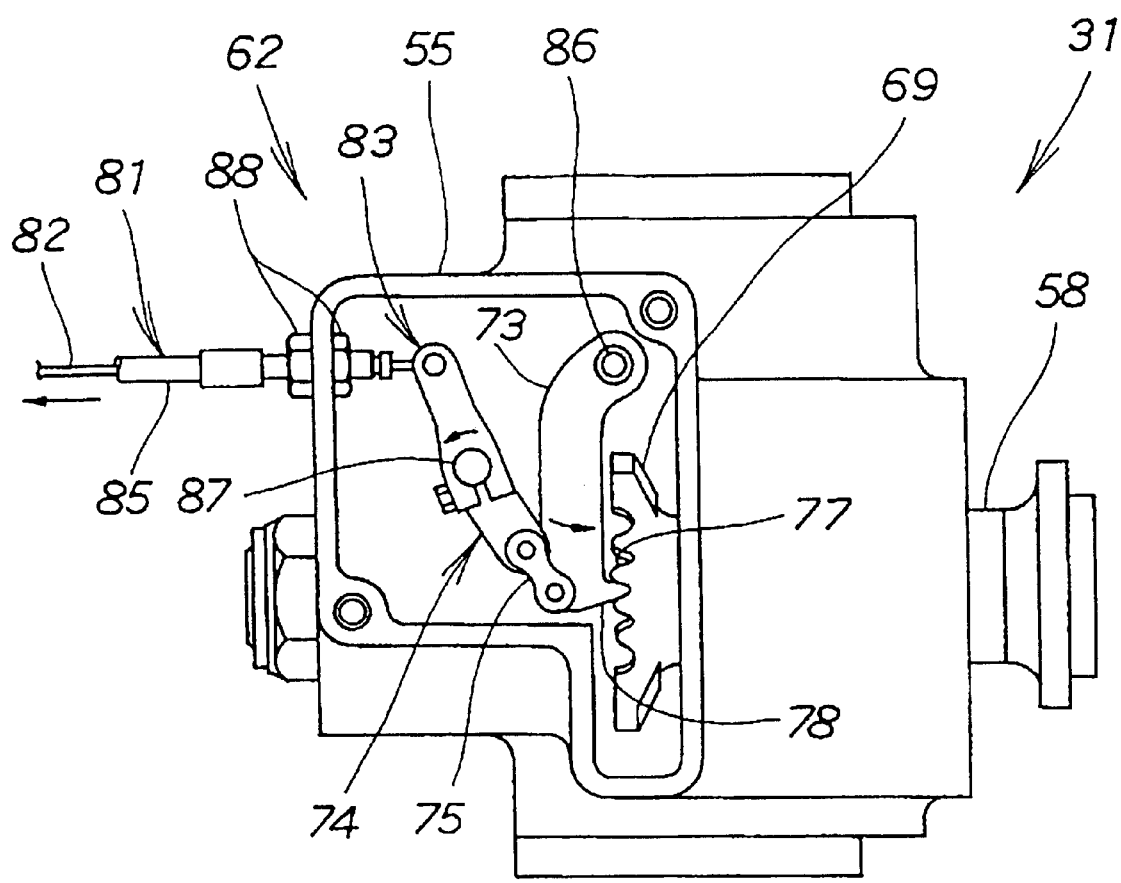
FIG. 13 is a fourth operation view for explaining operation of the parking lock device according to the present invention.

Referring now to FIG. 13, when the inner cable 82 of the cable for roll lock 81 is pulled, the second arm-like member 74 swings counterclockwise about the swing shaft 87, and accordingly, the first arm-like member 73 also swings counterclockwise about the swing shaft 86 through the link member 75, because of which the pawl 78 of the first arm-like member 73 meshes with the tooth 77 of the sideways projecting member 69. Accordingly, the rotation of the joint shaft 58 becomes locked to enable locking the relative roll between the front body 25 and the rear body 43 shown in FIG. 6.

Such a roll lock as described is used in order to prevent the front body 25 or the rear body 43 from rolling and falling down due to an unexpected cause, or to prevent unnecessary forces from being applied to the damper part 61 of the joint case 31.

Figure 14A:
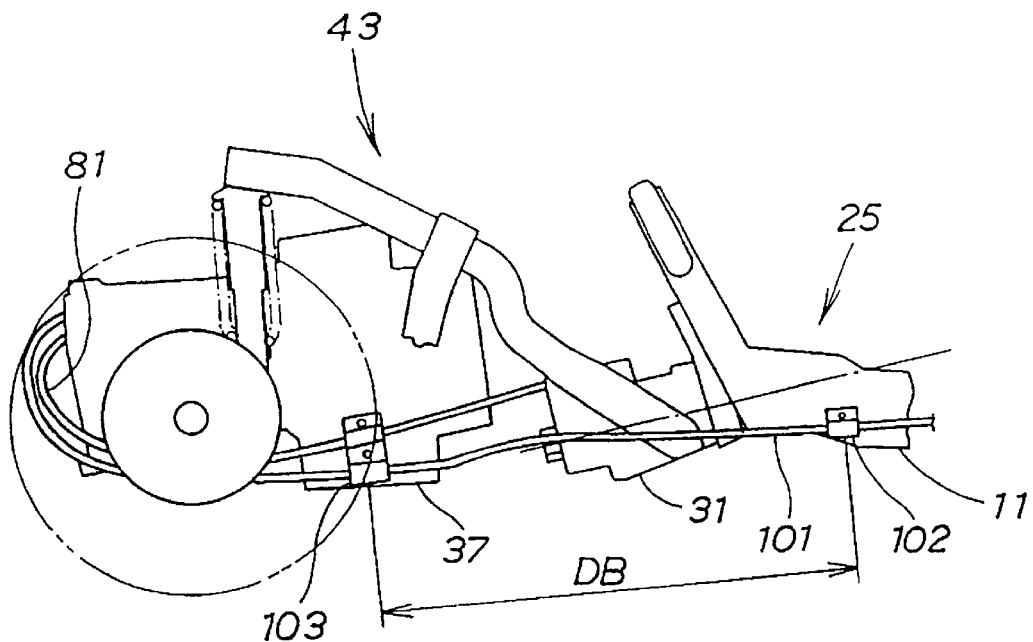
FIGS. 14A and 14B are fifth operation views for explaining operation of the parking lock device according to the present invention.

Referring now to FIG. 14A, the cable 101 for locking the rear wheels 41 is secured by the cable mounting bracket 102 on the side of the body frame 11 of the front body 25 and secured by the cable-mounting bracket 103 on the lower side of the power unit 37 of the rear body 43, whereby the distance DB between the cable mounting brackets 102 and 103 is set to be long.

Figure 15:
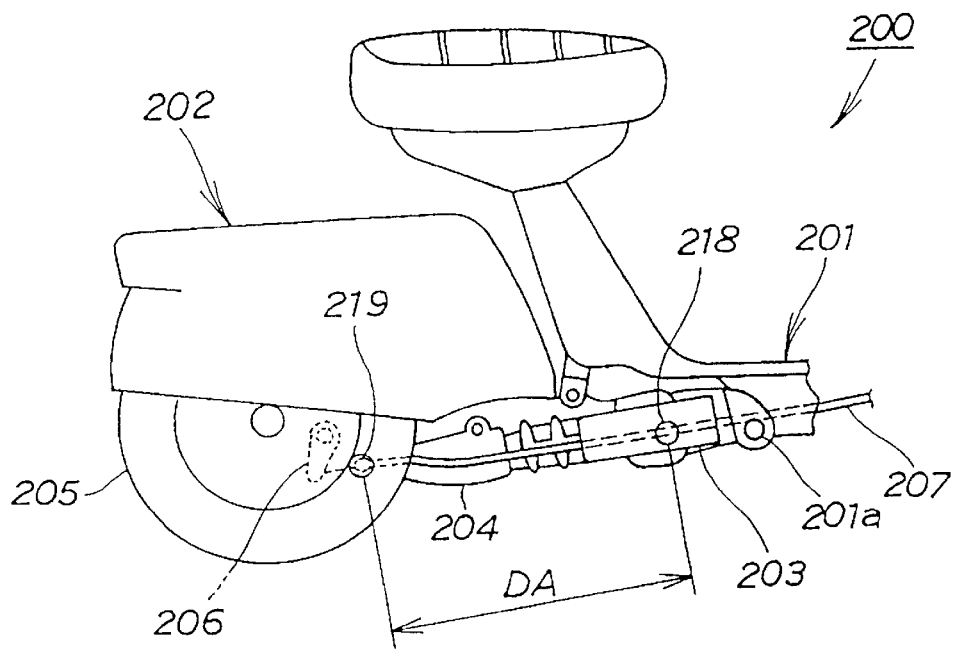
FIG. 15 is a side view of main parts of a conventional three-wheeled vehicle.
Figure 16:
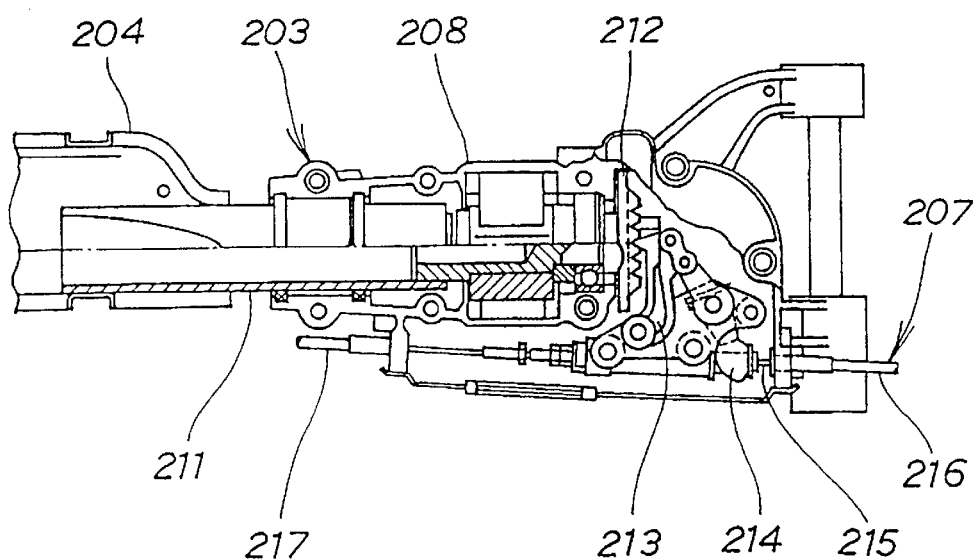
FIG. 16 is a sectional view of a conventional oscillating joint.

In the past, for example, in the embodiment shown in FIG. 15, the operating cable (in the present invention, the cable for locking rear wheels) is secured at the distance DA between the oscillating joint (in the present invention, the joint case) and the brake lever (in the present invention, the rear body), whereas in the present invention, as shown in FIG. 14A, the cable 101 for locking the rear wheels 41 is secured at the distance DB between the front body 25 and the rear body 43, and therefore, it is easy to obtain a setting of DB>DA. In the present invention, even if the external dimension (dimension in the longitudinal direction of the body) should be made small, it will be advantageous, with respect to the torsion of the cable 101 for locking the rear wheels 41, as compared with the prior art that the torsion is absorbed by the oscillating joint and the rear body.

Figure 14B:
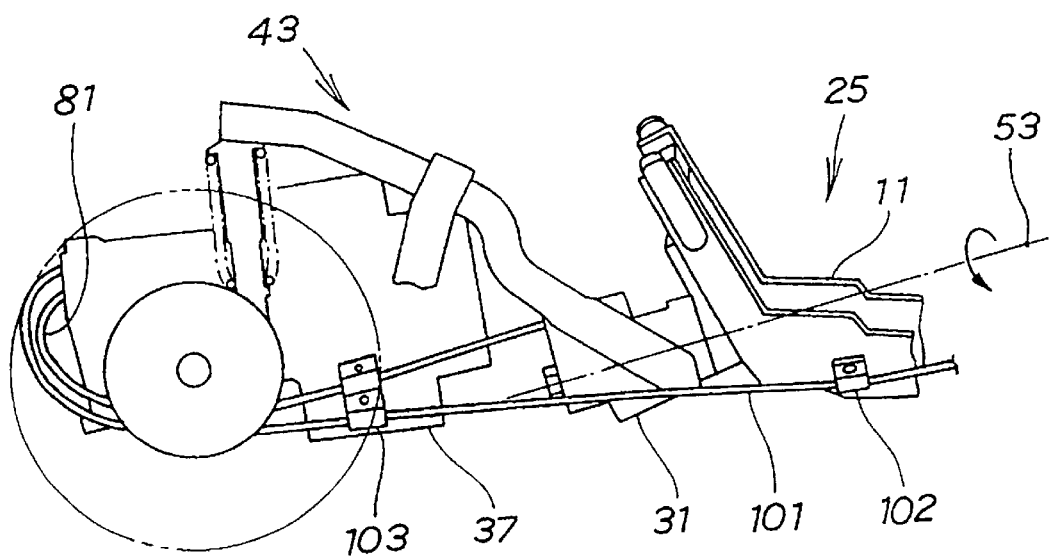

Referring now to FIG. 14B, for example, supposing that the front body 25 has rolled as indicated by the arrow about the shaft center 53 of the joint shaft 58 (see FIG. 3) of the joint case 31 with respect to the rear body 43, the cable 101 for locking the rear wheels 41 between the cable mounting brackets 102 and 103 is twisted. Since the distance between the cable mounting brackets 102 and 103 is set to be long, however, the angle of torsion of the cable 101 for locking the rear wheels 41 can be made small to prevent the cable 101 for locking the rear wheels 41 from being forcibly twisted.

Further, since the cable 81 for roll lock is mounted on the rear body 43 connected integrally with the joint case 31, it is possible to remove the effects of any roll of the front body 25, so that no torsion occurs in the cable 81 for roll lock.

As described above with reference to FIGS. 3 and 6, the present invention provides the parking lock device 135 for the three-wheeled vehicle 10 (see FIG. 1) in which the front body 25 having the front wheel 13 mounted thereon and the rear body 43 having the rear wheels 41 mounted thereon are joined by the joint shaft 58 extending in a substantially longitudinal direction of the vehicle and the case body 55, whereby the front body 25 and the rear body 43 are connected in a manner free to roll relatively with respect to one another. At the time of parking, the cable 101 for locking the rear wheels 41 is pulled whereby the relative rolling between the front body 25 and the rear body 43 can be locked, and the rotation of the rear wheels 41 can also be locked.

The parking lever 97 for drawing the cable 101 for locking the rear wheels 41 is provided on the body. The rear wheel lock mechanism 113 for locking the rear wheels 41 is provided on the rear body 43. The roll lock mechanism 62 for locking the relative rotation between the joint shaft 58 and the case body 55 is provided on the joint case 31 provided with the joint shaft 58 and the case body 55. The cable 101 for locking the rear wheels 41 extends between the parking lever 97 and the rear wheel lock mechanism 113. The cable for roll lock 81 extends between the rear wheel lock mechanism 113 and the roll lock mechanism 62.

Since the cable 101 for locking the rear wheels 41 is extended between the front body 25 and the rear body 43, the torsion of the cable 101 for locking the rear wheels 41 caused by the relative roll between the front body 25 and the rear body 43 can be absorbed over a long distance DB (see FIG. 14A) as compared with the prior art. Thereby, the excessive load is not applied to the cable 101 for locking the rear wheels 41, and the service life of the cable 101 for locking the rear wheels 41 can be extended.

Further, miniaturization of the joint case 31 for joining the front body 25 and the rear body 43 is less restricted, and accordingly, it is possible to lessen restriction in miniaturizing the whole body, and further, miniaturization of the body is realized to enable making the body light.

Further, the present invention is characterized in that the cable 101 for locking the rear wheels 41 is constituted by the first cable, and the cable for roll lock 81 is constituted by the second cable separately from the first cable. The first cable and the second cable can be constructed simply as compared with prior art. For example, if general cables are used as the first cable and the second cable, respectively, parts costs of the parking lock device can be considerably reduced.

Further, by making the construction of the first cable and the second cable simple, the maintenance such as mounting and dismounting or replacement of the cables can be carried out easily, and the maintenance costs of the cables and the parking lock device can be lowered.

As long as the position of the cable mounting brackets 102, 103 for securing the cable 101 for locking rear wheels 41 is on the body frame 11 and on the power unit 37 shown in FIG. 6, the position is not limited to that shown in FIG. 6, but may be set suitably in a range not impairing the durability of the cable 101 for locking the rear wheels 41 according to the size of the relative roll angle between the front body 25 and the rear body 43, the shape of the body frame 11 or the shape of the power unit 37.

Further, the three-wheeled vehicle according to the present invention is not limited to a vehicle of one front wheel and two rear wheels, but may be a wheel of two front wheels and one rear wheel.

In the parking lock device for a three-wheeled vehicle according to the present invention, the parking lever for drawing a cable is provided on the front body, the rear wheel lock mechanism for locking rear wheels is provided on the rear body, the roll lock mechanism for locking the relative rotation between a shaft and a bearing is provided in a joining between a shaft and a bearing, the front half of a cable is extended between the parking lever and the rear wheel lock mechanism, and the rear half part of a cable is extended between the rear wheel lock mechanism and the roll lock mechanism. Since the front half part of the cable is extended between the front body and the rear body, the torsion of the cable caused by the relative roll between the front body and the rear body can be absorbed at the long distance as compared with prior art.

With the present invention, excessive load is not applied to the cable, and there is less restrictions with respect to miniaturization of the joining part between the front body and the rear body, and accordingly, restrictions can be reduced in realizing miniaturization of the body, and further, the body may be miniaturized to enable making the body light.

In the parking lock device for a three-wheeled vehicle according to the present invention, the front half part of the cable is constituted by the first cable, and the rear half part of the cable is constituted by the second cable separate from the first cable. Therefore, the first cable and the second cable can be formed from a simple construction as compared with prior art. For example, if general cables are used, parts costs for the parking lock device can be reduced considerably. Furthermore, by making the construction of the cables simple, the maintenance such as mounting and dismounting or replacement of the cables can be carried out easily, and the maintenance costs of the parking lock device can be lowered.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A parking lock device for a three-wheeled vehicle in which a front body having a front wheel mounted thereon and a rear body having rear wheels mounted thereon are joined by a substantially longitudinally extending shaft and a bearing to thereby connect the front body and the rear body to be relatively rollable, said rear body including a rear-wheel lock mechanism for locking the rear wheels, a joint part between said shaft and said bearing being provided with a roll lock mechanism for locking the relative rotation between said shaft and said bearing, the parking lock device comprising:

a first cable extending between a parking lever and said rear-wheel lock mechanism; and said roll lock mechanism, whereby drawing of said first cable locks rotation of said rear wheels, and draws said second cable so that relative rolling between said front body and said rear body is locked.

2. A vehicle, comprising:

a front body having a front wheel mounted thereon and a parking lever mounted thereon;

a rear body having a rear wheel mounted thereon and a rear wheel lock mechanism for locking said rear wheel;

a joint part having a substantially longitudinally extending shaft and a bearing joining said front body to said rear body so that said front body is relatively rollable with respect to said rear body, said joint part including a roll lock mechanism for locking the relative rotation between said front body and said rear body;

a first cable extending between said parking lever and said rear wheel lock mechanism; and a second separate cable extending between said rear wheel lock mechanism and said roll lock mechanism, whereby drawing of said first cable locks rotation of said rear wheels, and draws said second cable so that relative rolling between said front body and said rear body is locked.

3. The vehicle according to claim 2, further comprising a first link interconnecting said first cable to said second cable.

4. The vehicle according to claim 3, wherein said first link is pivotable about a first pivot axis.

5. The vehicle according to claim 4, wherein said rear wheel lock mechanism comprises a first gear attached to an output shaft driving said rear wheel, and a first pawl interconnected with said first link and engagable with said first gear.

6. The vehicle according to claim 5, further comprising a second link located at one end of said second cable.

7. The vehicle according to claim 6, wherein said second link is pivotable about a second pivot axis.

8. The vehicle according to claim 7, wherein said roll lock mechanism comprises a second gear attached to said shaft, and a second pawl interconnected with said second link and engagable with said second gear.

9. The vehicle according to claim 2, further comprising a second link located at one end of said second cable.

10. The vehicle according to claim 9, wherein said second link is pivotable about a pivot axis.

11. The vehicle according to claim 10, wherein said roll lock mechanism comprises a second gear attached to said shaft, and a second pawl interconnected with said second link and engagable with said second gear.

\* \* \* \* \*